UNITED STATES PATENT OFFICE.

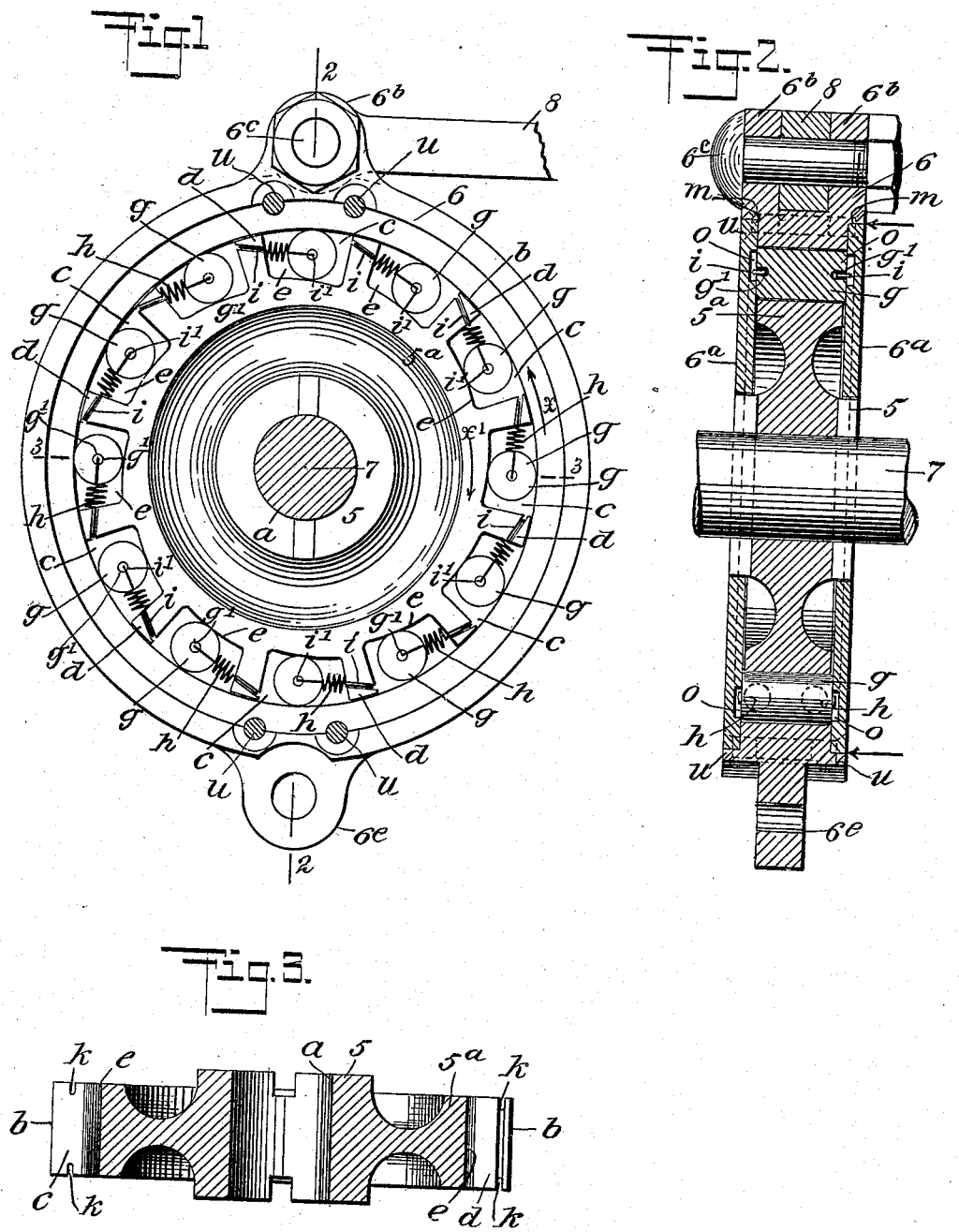

MILTON SHAKESPEARE SLAGHT AND THOMAS JOSEPH KELLY, OF EVERETT, WASHINGTON.

FRICTION-CLUTCH.

933,494. Specification of Letters Patent. Patented Sept. 7, 1909.

Application filed September 1, 1908. Serial No. 451,148.

*To all whom it may concern:*

Be it known that we, MILTON SHAKESPEARE SLAGHT and THOMAS JOSEPH KELLY, both citizens of the United States, and residents of Everett, in the county of Snohomish and State of Washington, have invented a new and Improved Friction-Clutch, of which the following is a full, clear, and exact description.

Our invention relates to clutches mainly circular in form, comprising a hub and radial body thereon, having a central opening for the reception of a shaft, an annular rim mounted on the circular edge of the radial body, and frictional locking means intervening between the rim and the body. In such a clutch, the rim may be connected with one portion of a machine and the hub and shaft therein with a coöperating portion thereof, and in operation a step by step rotatable motion be transmitted from one part of the mechanism to the other. Furthermore, in this style of clutch, the parts connected therewith may be permitted to operate independently, as may be necessary for the proper operation of the machine as an entirety.

One purpose of our invention is to provide novel details of construction for a friction clutch of the character indicated, which are simple, durable, practical, quick in operation, not liable to slip, and that will positively lock together two parts of a machine they are connected with, so that said parts will coöperate, or release said parts instantly, when this is essential for the proper operation of the parts connected by the improved clutch.

The improvement is particularly well adapted for use in connection with a type of shingle sawing machines, in which the thickness and taper of the shingles produced thereon are controlled by ratchet wheels and co-acting gearing; the substitution of the improved friction clutches for the ratchet gear greatly simplifying and improving the construction and operation of such a machine.

The invention is also of general utility, where it is essential that a quickly-releasable locked engagement is to be produced between working elements of mechanisms.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of the improved clutch, a side wall thereof the position of which is defined by the arrows in Fig. 2, being removed, and the securing bolts therefor represented in section; Fig. 2 is a vertical transverse sectional view of the clutch complete, taken substantially on the line 2—2 in Fig. 1; and Fig. 3 is a horizontal transverse section of the hub section for the clutch, taken substantially on the line 3—3 in Fig. 1.

The hub 5 of the central section of the improved clutch, is bored at the center, providing a transverse circular aperture $a$ therein, and upon the periphery of the hub, a radial body portion $5^a$ is formed having a circular edge $b$ that is concentric with the bore of the hub.

In the body portion $5^a$ and extending inwardly from the peripheral surface $b$, a plurality of equally spaced recesses or pockets $c$ are formed, which have equal length and similar depth, said pockets leaving narrow dividing walls $d$ remain intact with the body portion $5^a$. The bottom walls $e$ of the pockets $c$ are curved, so as to render them slightly convex, and are disposed eccentric to the periphery $b$, thus gradually diminishing in proper and equal degree the depth of the pockets from one end wall $d$ toward a corresponding end wall in the direction of the curved arrow $x$ in Fig. 1.

In each pocket $c$, a cylindrical roller $g$ is placed, having a diameter slightly less than the depth of the pocket at the deepest end thereof, and in each end of each roller an axial perforation $g'$ is formed. Two contractile springs $h$ formed of resilient wire, are provided for coöperation with a respective roller $g$, said springs each having a limb $i$ extended from the ends thereof.

In suitable grooves $k$, formed at each side of the body portion $5^a$ in the radial end walls $d$, one limb $i$ of each coiled spring $h$ is embedded and secured in each groove. On the opposite limb $i$ of each spring $h$, at its free end, a journal member $i'$ is formed by bending the limb at a right angle near its end, and each journal end is inserted in a respective end of the central perforation $g'$ in a corresponding roller $g$, as shown in Fig. 2.

The rim section 6 of the clutch is annular, and of somewhat greater thickness than the body portion $5^a$, said rim having a true central bore that receives the periphery $b$ of said body portion, whereon the rim fits loosely. In each side of the annular rim 6, at the inner edges thereof, an annular recess $m$ is formed, and in said recesses the similar side walls $6^a$ of the clutch, are seated at and near their edges, said side walls being removably secured in place by pins $u$, as indicated by dotted lines in Fig. 2.

In the inner surface of each side wall $6^a$, at a point that will dispose it opposite the journal ends $i'$ of the springs $h$, an annular channel $o$ is formed, which channels afford clearance for the limbs $i$ whereon said journal ends are formed, and it is to be understood that the rollers $g$ are of such proportionate length that they will be permitted to rotate, and also to slide in the pockets $c$ they respectively occupy.

It will be noted that when the rim 6 and side walls $6^a$ are mounted upon the body portion $5^a$, said rim on its inner surface will close the open outer side of each pocket $c$ and be adapted for an engagement therewith of the rollers $g$.

A shaft 7 is fitted and secured in the bore $a$ and represents one member of a machine or device that is to be controlled by the improved friction clutch.

Upon the periphery of the annular rim 6, two spaced ears $6^b$ are radially formed, between which one end of an arm 8 is pivoted by a transverse bolt $6^c$; said arm which appears broken away in Fig. 1, in service is extended to engage with another portion of the mechanism, not shown, that is actuated by the friction clutch. Opposite the ears $6^b$, a single similar ear $6^e$ is preferably formed on the rim section 6, to serve as a substitute for the connection of the arm 8 therewith, in case the ears $6^b$ become useless from wear or other cause; and the single ear is perforated centrally to receive a pivot bolt.

In operation, it will be seen that when a rotatable impulse in the direction of the arrow $x$ in Fig. 1 is given to the rim 6, the rollers $g$ will instantly respond to such a movement and roll or slide toward the end walls $i$, due to the pull of the springs $h$, and without jar or abrasion of surfaces, lock together the rim section 6 and the body portion $5^a$ secured to the shaft 7.

It will be noted that as the pair of springs $h$ employed in coöperation with each roller $g$, pull with equal tension on the ends of said roller, the rollers will always be maintained parallel with each other and with the shaft 7.

While the clutch will hold rigidly if the hub 5 and body portion $5^a$ are moved in the direction of the arrow $x$, it will be evident that if the rim portion 6 is retarded in speed, so that the rim 6 travels slower than the hub or shaft 7, the rollers will move in the direction of the arrow $x'$ and the clutch members will instantly be released, and shift one upon the other until the speed of the rim portion 6 is again increased in the direction of the arrow $x$, which will again lock the sections of the clutch together.

It is claimed for this device that it is generally applicable, where it is desired to give a step-by-step rotary motion to parts of mechanism, or to positively lock two elements together for simultaneous rotation, until a change in operation requires their instant release.

The center section may be described as a disk provided on its periphery with pockets having bottoms inclined in the same direction.

Having thus described our invention, we claim as new and desire to secure by Letters Patent:

1. A clutch comprising a disk provided on its peripheral surface with transverse pockets whose bottom walls are inclined in the same direction, a rim section encircling the disk, a roller in each pocket, and a pair of springs for each roller, said springs having one end connected with the end of the roller and the other with the pocket wall.

2. A clutch comprising a disk provided on its periphery with a plurality of transverse pockets, the bottom walls of said pockets being convex and disposed eccentric to the periphery of the disk, a rim section pivoted loosely on the periphery of the disk, a roller in each pocket, each of said rollers having in each of the ends thereof an axial perforation, and a pair of springs for each roller, said springs having one end secured in the end wall of the pocket and engaging the perforation with its other end for the purpose set forth.

3. In combination with a body portion having a central aperture, a shaft fixed therein, the body portion having a periphery concentric with the shaft and having a plurality of pockets formed therein extended inward from the periphery and spaced apart by radial end walls, the bottom wall of each pocket being disposed eccentric to the periphery of the body portion, of an annular rim section rotatably mounted upon the periphery of the body portion, said rim section having an annular recess in each inner edge thereof, a side wall having a central opening and secured at its edge in a respective recess, said side walls each having an annular channel in the inner side thereof, a cylindrical roller in each pocket, said roller having in each end an axial perforation, a coiled spring for each end of each roller, said spring having one end connected with the end wall of the pocket and the other with the perforation in the end of the roller, and an arm loosely secured by one end on the rim section.

In testimony whereof we have signed our names to this specification in the presence of two subscribing witnesses.

MILTON SHAKESPEARE SLAGHT.
THOMAS JOSEPH KELLY.

Witnesses:
A. E. PEAKE,
G. W. JENKS.